K. KÜPPERS.
METHOD OF AND APPARATUS FOR FORMING GLASS TUBES.
APPLICATION FILED MAY 19, 1919.

1,395,963.
Patented Nov. 1, 1921.

Inventor:
Karl Küppers
by
A. B. Foster
Attorney.

UNITED STATES PATENT OFFICE.

KARL KÜPPERS, OF AACHEN, GERMANY, ASSIGNOR, BY MESNE ASSIGNMENTS, TO THE CHEMICAL FOUNDATION, INC., A CORPORATION OF DELAWARE.

METHOD OF AND APPARATUS FOR FORMING GLASS TUBES.

1,395,963.  Specification of Letters Patent.  Patented Nov. 1, 1921.

Application filed May 19, 1919. Serial No. 298,309.

*To all whom it may concern:*

Be it known that I, KARL KÜPPERS, a subject of the King of Prussia, residing at Aachen, 58 Hubertus strasse, Germany, have invented certain new and useful Improvements in Methods of and Apparatus for Forming Glass Tubes, for which I have filed applications in Germany, November 13, 1916, and January 13, 1918, of which the following is a specification.

My invention relates to a method of forming glass tubes in which a skeleton body such as a tube or the like shaped wire netting is embedded.

The object of the invention is to provide glass tubes which are capable of resisting great pressure and are not liable to break.

Figure 1:
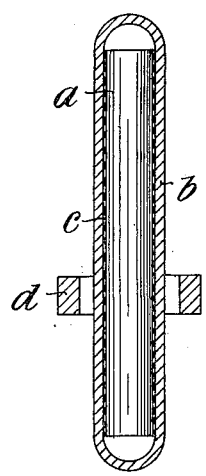
Figure 2:
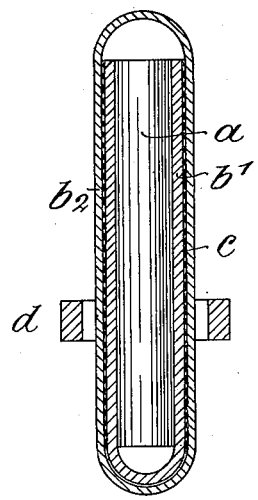

In order that the invention may be more clearly understood reference may be had to the accompanying diagrammatical drawing in which Figures 1 and 2 represent longitudinal sections of two different glass tubes according to the invention.

In carrying out the invention a tube or the like shaped wire net $c$ is placed over a mandrel $a$ of the desired form, and a glass tube $b$ is slipped over this wire net. The tube $b$ is closed at one end and a vacuum pump is connected to the other end and after drawing out the air, this end of the tube $b$ is also closed. A ring or the like $d$ heated by electric current, gas or any other suitable means is then placed over the mandrel and glass tube and moved upward or downward so that the glass tube $b$ is heated from end to end. The external air then compresses the softened part of the tube $b$ against the wire netting or other skeleton body $c$ whereby the glass passes through the meshes of the skeleton body $c$ and conforms to the shape of the mandrel $a$.

After the complete formation the tubes may be cooled in a similar manner to the action of a cooling furnace, and as soon as the glass is cooled down the mandrel or core is extracted and the skeleton body is then embedded in the glass of the tube.

Instead of a wire tube a coiled or otherwise shaped wire of any desired material such as copper, iron, steel and especially nickel-steel may be used as a skeleton body. In this manner a wire netting of very fine meshes and thin wires as well as a netting of large meshes and thick wires may be embedded in the glass tube.

The glass tubes manufactured according to the process just described have the skeleton body $c$ near the inner side of the glass tub $b$. If it is desired however to have the glass at both sides of the skeleton body $c$, a glass tube $b'$ (see Fig. 2) is placed over the mandrel $a$, the skeleton body $c$ mounted upon the glass tube $b'$ and a second glass tube $b^2$ arranged over the said skeleton body $c$. In this case the glass tube $b'$ may be closed at one end and open at the other end, while the second glass tube $b^2$ is closed at one end and at the other end treated in the same way as described with reference to Fig. 1. The ring $d$ heated by means of flames, electric current, gas or the like is moved in the manner described above with regard to the mandrel and glass tubes in order to soften both glass tubes $b'$, $b^2$, whereby the skeleton body $c$ is embedded between the glass tubes $b'$ and $b^2$ and the glass tubes together with the embedded skeleton body are pressed against the walls of the mandrel.

If desired the glass tube $b'$ may of course be pressed against the walls of the mandrel and then in a second stage the wire netting and second glass tube $b^2$ mounted upon the glass tube $b'$ which latter is thereupon heated in the manner described above.

I claim:

1. A process for the production of reinforced glass tubes which comprises placing a skeleton body upon a suitable mandrel, then placing a glass tube upon said skeleton body and said mandrel, closing one end of said glass tube, evacuating said tube, sealing the other end of said tube, and heating said tube by means of a suitably heated ring-shaped member with relative movement of said tube in order to heat its entire surface whereby the glass passes through the interstices of said skeleton body and conforms to the shape of said mandrel.

2. A process for the production of reinforced glass tubes which comprises placing a skeleton body upon a suitable mandrel, then placing a glass tube upon said skeleton body and said mandrel, closing one end of said glass tube, evacuating said tube, sealing the other end of said tube, heating said tube by means of a suitably heated ring-shaped member with relative movement of said tube in order to heat its entire surface whereby the glass passes through the interstices of said skeleton body and conforms to the shape of said mandrel and gradually cooling said tube.

3. A process for the production of reinforced glass tubes which comprises placing a skeleton body upon a suitable mandrel, then placing a glass tube upon said skeleton body and said mandrel, closing one end of said glass tube, evacuating said tube, sealing the other end of said tube, heating, said tube by means of a suitably heated ring-shaped member with relative movement of said tube in order to heat its entire surface whereby the glass passes through the interstices of said skeleton body and conforms to the shape of said mandrel gradually cooling said tube and finally removing said mandrel from the finished tube.

4. A process for the production of reinforced glass tubes which comprises placing a tube-shaped wire net upon a suitable mandrel, then placing a glass tube upon said tube-shaped wire net and said mandrel, closing one end of said glass tube, evacuating said tube, sealing the other end of said tube, heating said tube by means of a suitably heated ring-shaped member with relative movement of said tube in order to heat its entire surface whereby the glass passes through the interstices of said tube-shaped wire net and conforms to the shape of said mandrel, gradually cooling said tube and finally removing said mandrel from the finished tube.

KARL KÜPPERS.